(12) United States Patent
Baek et al.

(10) Patent No.: US 6,974,857 B1
(45) Date of Patent: Dec. 13, 2005

(54) END-CAPPED QUINOXALINE-CONTAINING HYPERBRANCHED AROMATIC POLY(ETHER-KETONES)

(75) Inventors: Jong-Beom Baek, Cheongju (KR); Loon-Seng Tan, Centerville, OH (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 128 days.

(21) Appl. No.: 10/729,563

(22) Filed: Dec. 8, 2003

Related U.S. Application Data

(63) Continuation-in-part of application No. 10/695,735, filed on Oct. 23, 2003, now Pat. No. 6,849,707.

(60) Provisional application No. 60/453,334, filed on Feb. 28, 2003.

(51) Int. Cl.[7] .................. C08G 73/00; C08G 73/22
(52) U.S. Cl. .................. 528/423; 528/192; 528/193; 528/194; 528/224
(58) Field of Search .................. 528/220, 192, 528/193, 224, 423

(56) References Cited

U.S. PATENT DOCUMENTS

| | | | |
|---|---|---|---|
| 6,608,171 B1 * | 8/2003 | Tan et al. | 528/423 |
| 6,639,042 B1 * | 10/2003 | Baek et al. | 528/170 |
| 6,642,347 B1 * | 11/2003 | Baek et al. | 528/310 |
| 6,743,889 B1 * | 6/2004 | Tan et al. | 528/220 |
| 6,849,707 B1 * | 2/2005 | Baek et al. | 528/423 |

OTHER PUBLICATIONS

Jong-Beom Baek, Loon-Seng Tan, Improved syntheses of poly(oxy-1,3-phenylenecarbonyl-ly4-phenylene) and☐☐related polyether-ketones) using polyphosphoric acid/P2O5 as polymerization medium, Polymer, 44 (2003) ☐☐4135-4147, published Jul. 2003.*

Jong-Beom Baek, Loon-Seng Tan, Synthesis of Hyperbranched Poly(Ether-Ketone)☐☐Containg Quinoxaline Moieth From An AB2 Monomer in Polyphosphoric AcidP2O5,☐☐Polymer Preprints, 2002, 43(1), 4-515, published in Mar. 2002.*

\* cited by examiner

*Primary Examiner*—James J. Seidleck
*Assistant Examiner*—Irina S. Zemel
(74) *Attorney, Agent, or Firm*—AFMCLO/JAZ; Charles E. Bricker

(57) ABSTRACT

An end-capped quinoxaline-containing hyperbranched ether-ketone polymer having repeating units of the formula:

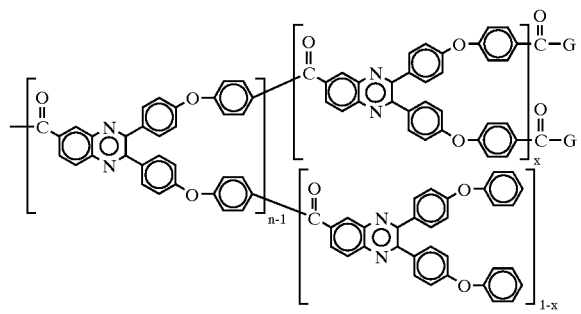

wherein n represents the degree of polymerization for the parent hyperbranched polymer, x represents the degree of endgroup functionalization, x has a value of 0.05 to 1.0, and G is selected from the group consisting of

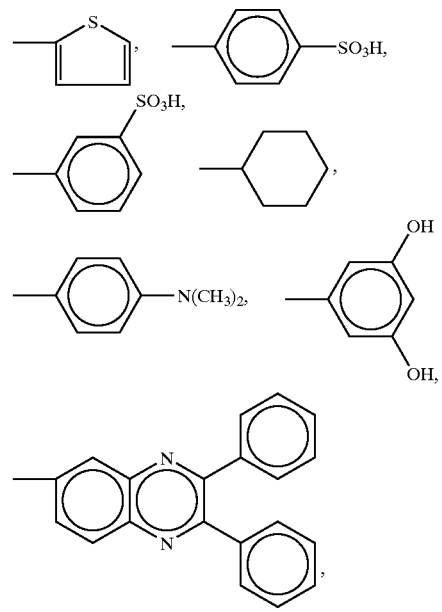

and alkyl having 2 to 16 carbon atoms, and a method for preparing the polymer are provided.

4 Claims, No Drawings

END-CAPPED QUINOXALINE-CONTAINING HYPERBRANCHED AROMATIC POLY(ETHER-KETONES)

This application is a continuation-in-part of application Ser. No. 10/695,735, filed Oct. 23, 2003, now U.S. Pat. No. 6,849,707, which, in turn, claims benefit of priority of the filing date of Provisional Application No. 60/453,334, filed Feb. 28, 2003.

RIGHTS OF THE GOVERNMENT

The invention described herein may be manufactured and used by or for the Government of the United States for all governmental purposes without the payment of any royalty.

BACKGROUND OF THE INVENTION

The present invention relates to a new quinoxaline-containing hyperbranched ether-ketone polymers.

Dendritic macromolecules such as dendrimers and hyperbranched polymers are a new class of highly branched polymers that have distinctly different properties from their linear analogs. Both dendrimers and hyperbranched polymers have much lower solution and melt viscosities than their linear analogs of similar molecular weights. They also have a large number of chain-ends whose collective influence dictates their overall physical and/or chemical behaviors. These features are attractive in terms of processability and offering flexibility in engineering required properties for specific applications. However, there is a practical advantage that hyperbranched polymers have over dendrimers at "raw material" level. Although dendrimers have precisely controlled structures (designated as generations), their preparations generally involve tedious, multi-step sequences that are impractical and costly in scale-up production. Synthesis of a hyperbranched polymer, on the other hand, is a one-pot process. Large quantities of hyperbranched polymers can be easily produced from $AB_x$ ($x \geq 2$) monomers.

Because of their excellent thermal and mechanical properties, as well as their optical and electronic characteristics, aromatic, fused heterocyclic polymers such as polyquinoxalines and polybenzoxazoles continue to attract considerable attention. However, they have limited processability due to the nature of fused ring systems. Their insolubility and their softening temperatures are generally above their degradation temperatures. Chemical modification on the these materials, for example, by the use of solubilizing pendants or flexible units in the main chain, has been successful to improve their processability, allowing the optimization of their properties as a function of processability. Another viable approach to achieving this objective is to incorporate the elements of local rigidity and global randomness into the macromolecular architecture. Local rigidity provides the thermal, electronic and optical characteristics of the aromatic fused systems while global randomness frustrates entanglement of the polymer chains, leading to greater solubility. Dendritic structures clearly embody these qualities. However, as noted previously, hyperbranched structures have greater synthetic practicality.

Accordingly, it is an object of the present invention to provide novel quinoxaline-containing hyperbranched poly(ether-ketones).

It is another object of the present invention to provide novel end-capped quinoxaline-containing hyperbranched poly(ether-ketones).

It is another object of the present invention to provide a novel method for preparing end-capped quinoxaline-containing hyperbranched poly(ether-ketones).

Other objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

SUMMARY OF THE INVENTION

In accordance with the present invention there is provided a quinoxaline-containing hyperbranched ether-ketone polymer having repeating units of the formula:

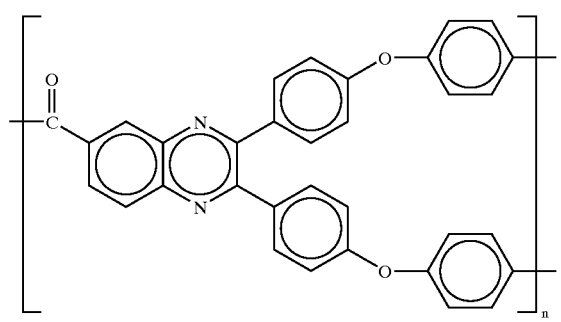

Also provided is an end-capped quinoxaline-containing hyperbranched ether-ketone polymer having repeating units of the formula:

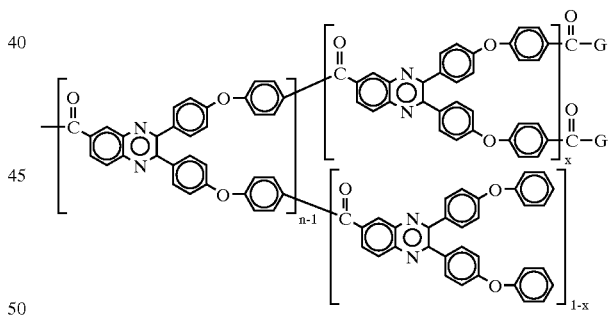

wherein n represents the degree of polymerization for the parent hyperbranched polymer, x represents the degree of endgroup functionalization, x has a value of 0.05 to 1.0, and G is selected from the group consisting of

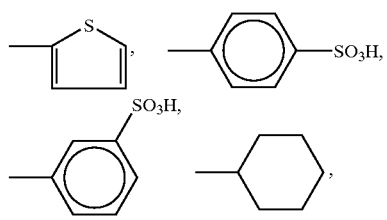

-continued

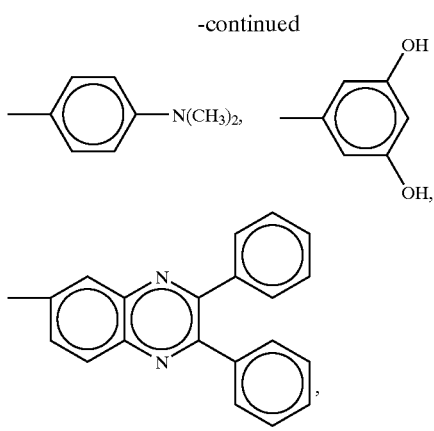

and aliphatic carboxylic acids having 2 to 16 carbon atoms, i.e., $C_qH_{2q+1}COOH$, wherein q has a value of 1 to 15.

DETAILED DESCRIPTION OF THE INVENTION

The quinoxaline-containing hyperbranched ether-ketone polymer of this invention is prepared by polymerization of the corresponding $AB_2$ monomer

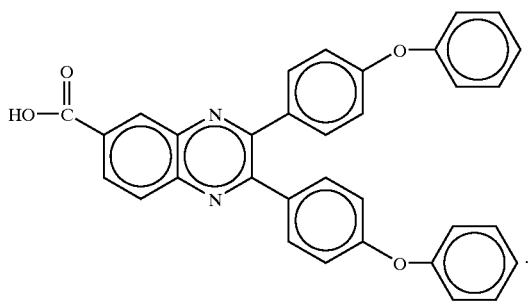

Preparation of the $AB_2$ monomer, 2,3-bis(4-phenyloxyphenyl)-6-quinoxaline carboxylic acid, is described in co-pending application Ser. No. 10/695,730, filed Oct. 23, 2003.

Polymerization of the $AB_2$ monomer can be conducted in polyphosphoric acid (PPA) at a polymer concentration of about 5 weight percent at a temperature of about 130° C. Preliminarily it is helpful to describe the chemistry of phosphoric acids and strong phosphoric acids or polyphosphoric acids as follows: As used herein the term "phosphoric acid(s)" means commercial phosphoric acid(s) containing 85–86% $H_3PO_4$. The strong phosphoric acids, or polyphosphoric acids referred to as PPA (polyphosphoric acid) are members of a continuous series of amorphous condensed phosphoric acid mixtures given by the formula

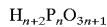

or

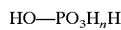

where the value of n depends on the molar ratio of water to phosphorus pentoxide present.

In its most general definition, polyphosphoric acid composition can range from distributions where the average value of n is less than unity, giving rise to a mobile liquid, to high values of n, where the polyphosphoric acid is a glass at normal temperatures. Because the species of polyphosphoric acid are in a mobile equilibrium, a given equilibrium composition can be prepared in many ways. For instance, the same distribution or polyphosphoric acid composition could be prepared by either starting with concentrated orthophosphoric acid ($H_3PO_4$, n=1) and driving off water or by starting with phosphorus pentoxide ($P_2O_5$) and adding an appropriate amount of water.

All polyphosphoric acid compositions can be described as a ratio of $P_2O_5$ and water by reducing the various species present (on paper) to $P_2O_5$ and water. We will then use the convention that polyphosphoric acid composition will be expressed in terms of a $P_2O_5$ content (as a percentage) defined as $P_2O_5$ content =(weight of $P_2O_5$)/(weight of $P_2O_5$+weight of water)×100.

Thus, the $P_2O_5$ content of pure orthophosphoric acid could be derived by reducing one mole of $H_3PO_4$ to 0.5 moles $P_2O_5$+1.5 moles $H_2O$. Converting to weights gives the $P_2O_5$ content as (0.5*142)/((0.5*142)+(1.5*18.01))=72.4%

Similarly, the $P_2O_5$ content of commercial polyphosphoric acid can be derived in the following way. Polyphosphoric acid is available commercially in two grades, 105% and 115%. These percentages refer to $H_3PO_4$ content, which means that 100 g of the two grades contain 105 and 115 grams of $H_3PO_4$. The $P_2O_5$ content of 115% polyphosphoric acid can then be calculated knowing the $P_2O_5$ content of 100% $H_3PO_4$.

(115*0.724)/100=83.3%

We have found that the rate of polymerization can be accelerated by adding about 25% additional phosphorus pentoxide (relative to the weight of PPA) to the polymerization mixture, as shown in the examples which follow.

Due to the availability of large number of end-groups, the end-functionalization of hyperbranched polymers can be utilized to tailor their physical properties for various applications. The number of reactive end-groups is equal to the degree of polymerization plus one (DP+1). A sufficient quantity of the selected endcapping compound is added to the polymerization mixture to provide about 5 to 99 mol % endcapping. The hyperbranched polymers can be endcapped using a variety of endcapping compounds, for example, but not limited to, 3,5-dihydroxybenzoic acid, 3-sulfobenzoic acid, 4-sulfobenzoic acid and 2,3-diphenylquinoxaline-6-carboxylic acid. 2-thiophenecarboxylic acid, 4-dimethylaminobenzoic acid, cyclohexanecarboxylic acid, acetic acid through and including palmitic acid, and the like. For example, endcapping the hyperbranched polymer with 3,5-dihydroxybenzoic acid provides 3,5-dihydroxyphenylcarbonyl moieties as chain-end units

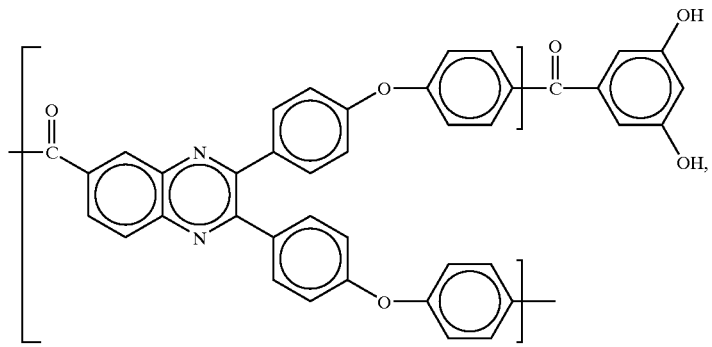

which, in turn, can be modified with allylbromide to provide the diallyl-terminated hyperbranched polymer having 3,5-di-allyloxyphenylcarbonyl moieties as chain-end units:

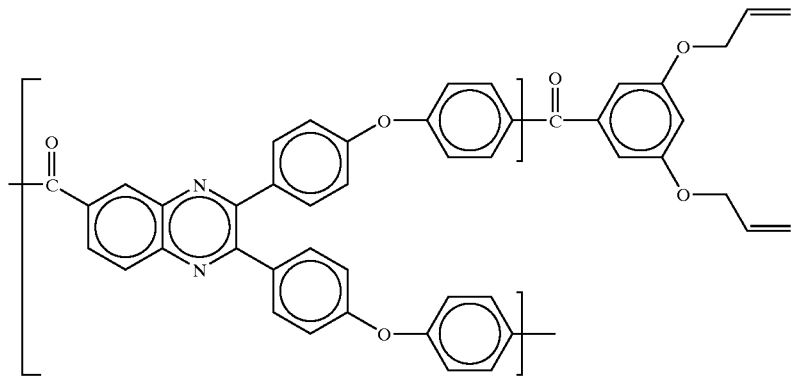

Other reactive endgroups, such as propargyl and glycidyl functions, can be prepared from the 1,3-dihydroxyphenyl-terminated derivative using similar reactions.

The hyperbranched polymers of this invention are suitable for use in applications where the material will be subject to high service temperatures.

The following examples illustrate the invention:

EXAMPLE 1

Polymerization of 2,3-bis(4-phenyloxyphenyl)-6-quinoxaline-carboxylic acid ($AB_2$ monomer) in PPA at 130° C.

Into 250 mL resin flask equipped with a high-torque mechanical stirrer and nitrogen inlet and outlet, a pressure regulator, and an addition port, polyphosphoric acid (PPA, 60 g) was charged. The PPA was degassed under reduced pressure by freezing in liquid nitrogen and melting in warm water several times. Then the monomer, 2,3-bis(4-phenyloxyphenyl)-6-quinoxaline-carboxylic acid (3.0 g, 5.9 mmol), was introduced. As soon as the monomer was added and the stirring started, the mixture became deep blue-purple. The mixture was heated to 130° C. and kept at this temperature for 48 h. Although the mixture had become deep red, its viscosity was not significantly increased. The reaction mixture was allowed to cool to 60–70° C. and water was added to precipitate the polymer. The resulting mixture was warm at 60–70° C. overnight under the nitrogen. The resulting bright yellow solids were collected by suction filtration, washed with diluted ammonium hydroxide, and large amount of water. The polymer was finally dried under reduced pressure (0.05 mmHg) at 200° C. for 150 h to give essentially quantitative yield: [η]=0.07 dL/g (0.5% solution in MSA at 30.0±0.1° C.). Anal. Calcd. for $C_{33}H_{20}N_2O_3$ C, 80.47%; H, 4.09%; N, 5.69%; O, 9.75%. Found: C, 78.69%; H, 4.34%; N, 5.27%; O, 10.81%.

EXAMPLE 2

Polymerization of $AB_2$ Monomer in $PPA/P_2O_5$ at 130° C.

Into a 250 mL resin flask equipped with a high-torque mechanical stirrer, nitrogen inlet and outlet, a pressure regulator and an addition port, PPA (83% assay, 80 g) was placed and stirred with dried nitrogen purging at 100° C. for 10 h. The monomer 2,3-bis(4-phenoxyphenyl)-6-quinoxaline-carboxylic acid (4.0 g) was added and heated to 130° C. until it become a homogeneous mixture. It usually took about 1 h. The color of mixture became dark brown. $P_2O_5$ (20.0 g; 25 wt % relative to PPA used) was then added in one portion and the temperature was maintained at 130° C. for 24 h. The mixture became very viscous after 2 h at 130° C. and started to stick to the stirring rod. At the end of the reaction, water was added into the flask. The resulting precipitates were collected by suction filtration, washed with diluted ammonium hydroxide followed by a large amounts of water, stirred in boiling water for 100 h, and finally dried in the presence of phosphorous pentoxide under reduced pressure (1 mmHg) at 200° C. for 48 h. The yield was essentially quantitative (>99% yield). Its intrinsic viscosity is 0.56 dL/g (MSA, 30±0.1° C.). Anal. Calcd. for $C_{33}H_{19}N_2O_3$: C, 80.47%; H, 4.09%; N, 5.69%; O, 9.75%. Found: C, 80.08%; H, 4.57%; N, 3.69%; O, 10.34%.

EXAMPLE 3

Polymerization of $AB_2$ Monomer in $PPA/P_2O_5$ at 160° C.

Into a 100 mL resin flask equipped with a high torque mechanical stirrer, nitrogen inlet and outlet, a pressure regulator and an addition port, PPA (83% assay, 40 g) was placed and stirred with dried nitrogen purging at 100° C. for 10 h. The monomer, 2,3-bis(4-phenyloxyphenyl)-6-quinoxaline-carboxylic acid (1.80 g, 3.5 mmol) and $P_2O_5$ (10.0 g) were added and the mixture heated to 130° C. until it become a homogeneous mixture. It took about 3 h. The mixture was then heated at 160° C. and it soon stuck to the stirring rod, rendering further efficient stirring/mixing impossible. It took around 3 h. At the end of the reaction, water was added into the reaction vessel. The resulting lumps were broken up with the aid of a Waring blender, and the polymer product was collected by suction filtration, washed with diluted ammonium hydroxide and then with a large amount of water, stirred in boiling water for 100 h, and finally dried in the presence of phosphorous pentoxide under reduced pressure (1 mmHg) at 200° C. for 48 h. The yield was essentially quantitative (>99% yield). The polymer was insoluble in most organic solvents and only formed gel in methanesulfonic acid (MSA). Anal. Calcd. for $C_{33}H_{19}N_2O_3$: C, 80.47%; H, 4.09%; N, 5.69%. Found: C, 78.34%; H, 4.34%; N, 5.27%.

EXAMPLE 4

Polymerization in 1:10 w/w Mixture of $P_2O_5$/Methanesulfonic Acid (PPMA) at 110° C.

Into a 100 mL 3-necked round bottom flask equipped with a mechanical stirrer, nitrogen inlet and outlet, the monomer 2,3-bis(4-phenoxyphenyl)-6-quinoxaline-carboxylic acid (1.0 g, 1.96 mmol) and PPMA (10 mL) were added and heated to 110° C. for 8 h. The color of mixture became dark purple. The mixture was poured into ice water. The resulting purple precipitates were collected by suction filtration, washed with diluted ammonium hydroxide and then with large amount of water, stirred in boiling water for 48 h, and finally dried in the presence of phosphorous pentoxide under reduced pressure (1 mmHg) at 200° C. for 48 h. The yield was essentially quantitative (>99% yield). Its intrinsic viscosity was 0.50 dL/g (MSA, 30±0.1° C.). Anal. Calcd. for $C_{33}H_{19}N_2O_3$: C, 80.47%; H, 4.09%; N, 5.69%; O, 9.75%. Found: C, 78,12%; H, 4.33%; N, 5.27%; O, 10.77%.

The polymerization results are summarized in Table 1.

TABLE 1

Polymerization Conditions and Yields of Polymer

| Example | Media | $P_2O_5$ (wt %)[a] | Temp. (° C.) | Time (h) | [η] dL/g[b] | Yield (%) |
|---|---|---|---|---|---|---|
| 1 | PPA | 0 | 130 | 48 | 0.07 | ~97 |
| 2 | PPA | 25 | 130 | 24 | 0.56 | >99 |
| 3 | PPA | 25 | 160 | 3 | Gel | >99 |
| 4 | MSA | 10 | 110 | 8 | 0.50 | >99 |

[a]Relative to the amount of PPA used.
[b]Intrinsic viscosity measured in methanesulfonic acid (MSA) at 30 ± 0.1° C.

Thermal Properties. The $T_g$'s of the polymers were determined by DSC. The thermograms were obtained on powder samples after they had been heated to 400° C. and cooled to 20° C. with heating and cooling rate of 10° C./min. The $T_g$ value was taken as the mid-point of the maximum baseline shift from the second run. The polymer samples (Examples 1–4), which were prepared from different reaction conditions, displayed $T_g$'s at 149° C., 113° C., not detectable, 91° C., in that order. Thermogravimetric analysis of these polymers showed that they were heat-resistant; temperatures at which a 5% weight loss was observed were in the range of 505–525° C. in air and 515–536° C. in helium, respectively.

EXAMPLE 5

Preparation of 3,5-dihydroxy-terminated polyetherketonequinoxaline

Into a 250 mL resin flask equipped with a high torque mechanical stirrer, nitrogen inlet and outlet, a pressure regulator and an addition port, PPA (83% assay, 80 g), $P_2O_5$ (20.0 g; 25 wt % relative to PPA used) were placed and heated to 130° C. until it became homogeneous. After the reaction medium had been allowed to cool to 100° C., the monomer, 2,3-bis(4-phenoxyphenyl)-6-carboxyquinoxaline (4.0 g, 3.92 mmol) and the end-capper 3,5-dihydroxybenzoic acid (1.21 g, 7.84 mmol) were added at the same time. The color of mixture became deep purple. The mixture was heated at 130° C. for 2 h, and at 160° C. for 24 h. When the polymerization was terminated, the mixture was moderately viscous. It was allowed to cool to 100° C. (still fluid) to facilitate pouring into water. The resulting precipitates were collected by suction filtration, washed with diluted ammonium hydroxide and then with a large amounts of water, Soxhlet-extracted with water for 50 h and then with methanol for additional 50 h, and finally dried in the presence of phosphorous pentoxide under reduced pressure (1 mmHg) at 100° C. for 48 h. The yield was essentially quantitative (>99% yield). The reduced viscosities at 0.5 g/dL were 0.09 dL/g (NMP, 30±0.1° C.) and 0.21 dL/g (MSA, 30±0.1° C.). Anal. Calcd. for $C_{40}H_{24}N_2O_6$: C, 76.43%; H, 3.85%. Found: C, 76.05%; H, 4.28%.

EXAMPLE 6

Preparation of 3,5-diallyl-terminated polyetherketonequinoxaline

Into a 100 mL three-necked, round-bottomed flask equipped with a magnetic stirrer, nitrogen inlet, a condenser, and an addition port, hydroxyl-terminated hyperbranched polymer (example 5; 3.5 g, 5.57 mmol), potassium carbonate (4.0 g, 28.90 mmol), allyl bromide (3.37 g, 27.86 mmol), and dimethylacetamide (50 mL) were placed. The reaction mixture was then heated and maintained at 90–100° C. for 16 h. During this time period, the orange solution became light yellow in color and homogeneous. After it had been allowed to cool down on its own, the mixture was filtered through a cake of Celite 545 to remove any insoluble salts. The filtrate was poured into a beaker containing 5% hydrochloric acid (300 mL) and the mixture was warmed up to around 60–70° C. for 2 h. The white powder was collected, air-dried, dissolved in dichloromethane, precipitated in methanol, collected, and dried under the reduced pressure in the presence of phosphorus pentoxide at 50° C. for 48 h. The yield was essentially quantitative. [η]=0.13 dL/g. Anal. Calcd. for $C_{46}H_{32}N_2O_6$: C, 77.95%; H, 4.55%; N, 3.95%; O, 13.54%. Found: C, 77.82%; H, 4.49%; N, 3.67%; O, 13.45%.

Having thus described exemplary embodiments of the present invention, it should be noted by those skilled in the art that the disclosures herein are exemplary only and that alternatives, adaptations and modifications may be made within the scope of the present invention.

We claim:

1. An end-capped quinoxaline-containing hyperbranched ether-ketone polymer having the formula:

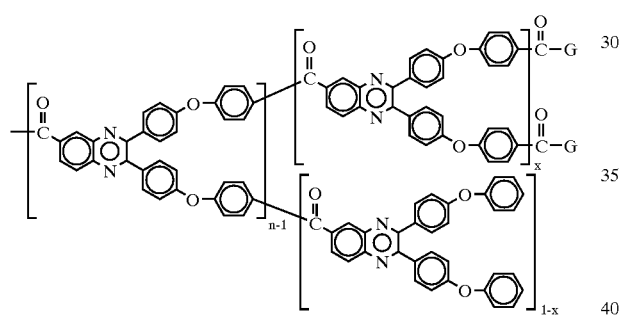

wherein n represents the degree of polymerization for the hyperbranched polymer, x represents the degree of endgroup functionalization, x has a value of 0.05 to 1.0, and G is selected from the group consisting of

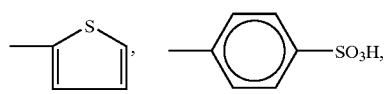

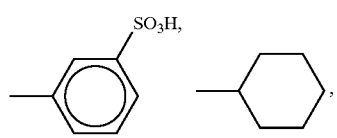

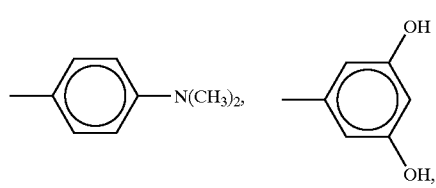

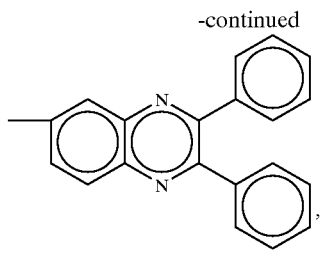

and $C_qH_{2q+1}$, wherein q has a value of 1 to 15.

2. The polymer of claim 1 wherein said endgroup G is

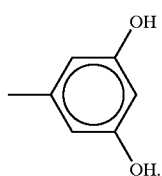

3. A method for the polymerization of an end-capped quinoxaline-containing hyperbranched ether-ketone polymer having repeating units of the formula:

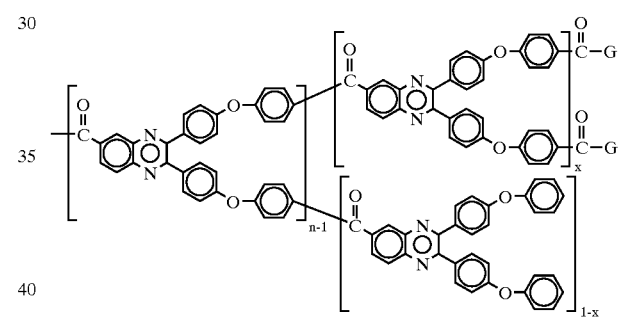

wherein n represents the degree of polymerization for the hyperbranched polymer, x represents the degree of endgroup functionalization and has a value of 0.05 to 1.0, and G is selected from the group consisting of

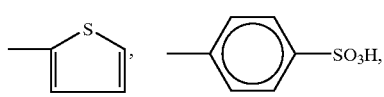

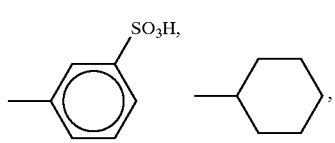

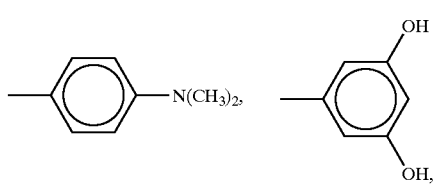

-continued

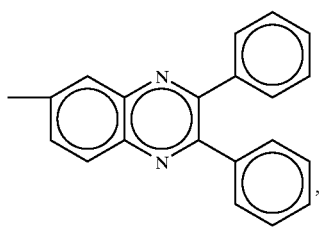

and $C_qH_{2q+1}$, wherein q has a value of 1 to 15, which comprises heating 2,3-bis(4-phenoxyphenyl)-6-quinoxaline-carboxylic acid and an end-capping agent G—COOH, in a polymerization medium consisting of polyphosphoric acid with 83% $P_2O_5$ content with 25 weight percent additional $P_2O_5$ relative to said polyphosphoric acid to a temperature of about 130° C. for about 24 hours and recovering the resulting polymer.

4. The method of claim 1 wherein said endgroup G is

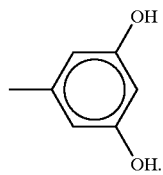

* * * * *